United States Patent [19]
de Souza et al.

[11] Patent Number: 5,848,418
[45] Date of Patent: Dec. 8, 1998

[54] ELECTRONIC FILE ANALYZER AND SELECTOR

[75] Inventors: Peter André de Souza; Michael F. Angelo, both of Houston, Tex.

[73] Assignee: WatchSoft, Inc., Houston, Tex.

[21] Appl. No.: 802,118

[22] Filed: Feb. 19, 1997

[51] Int. Cl.$^6$ .............................. G06F 17/00; G06F 17/30
[52] U.S. Cl. .............................. 707/102; 707/6; 707/102; 707/203; 345/335
[58] Field of Search ......................... 707/1–10, 100–104, 707/200–204; 395/705, 708; 345/335; 390/420

[56] References Cited

U.S. PATENT DOCUMENTS

| | | | |
|---|---|---|---|
| 5,608,874 | 3/1997 | Ogawa et al. | 395/200.15 |
| 5,642,509 | 6/1997 | Ohshima et al. | 395/682 |
| 5,706,507 | 1/1998 | Schloss | 395/615 |
| 5,710,883 | 1/1998 | Hong et al. | 395/200.17 |
| 5,710,918 | 1/1998 | Lagarde et al. | 395/610 |
| 5,715,397 | 2/1998 | Ogawa et al. | 395/200.18 |

*Primary Examiner*—Thomas G. Black
*Assistant Examiner*—David Yiuk Jung
*Attorney, Agent, or Firm*—Wendy K. Buskop; Chamberlain, Hrolicka et al.

[57] ABSTRACT

An apparatus and method for finding objectionable material contained within electronic files is presented. The apparatus consists of a computer system that is provided with a computer, a video display, a buffer memory, and at least one electronic file storage device capable of storing electronic files. Each of the electronic files is stored according to an operating system which incorporates a file name and a file name suffix. The method includes provisions for a real type property, a claimed type property, and a result type property for each electronic file. All of the electronic files are located on each of said storage devices for checking. During the checking process, for example, each file is checked to determine the file's real type property. If the checked file is determined to be a graphics file, then the file will be identified as a graphics file. If the file is not a graphics file, (i.e., it is a text file) then it is interrogated in order to determine if the text contains objectionable language. If objectionable language is found, then the text file is flagged as suspicious or questionable. A listing of all suspicious, questionable, or graphics files are presented to the user who may then review the file for further processing or destroy it.

18 Claims, 5 Drawing Sheets

```
type
    TFileProperties = record
        Size: LongInt;              —602
        Date_Time: TDateTime;       —604
        Mode: string;               —606
        Color_Code: TColor;         —608
        File_Name: string;          —610
        File_Signature: string      —611
        File_Suffix: string;        —612
        Reason: string;             —614
        Real_Type: integer;         —616
        Claimed_Type: integer       —618
        Result_Type: integer        —620
    end;
```

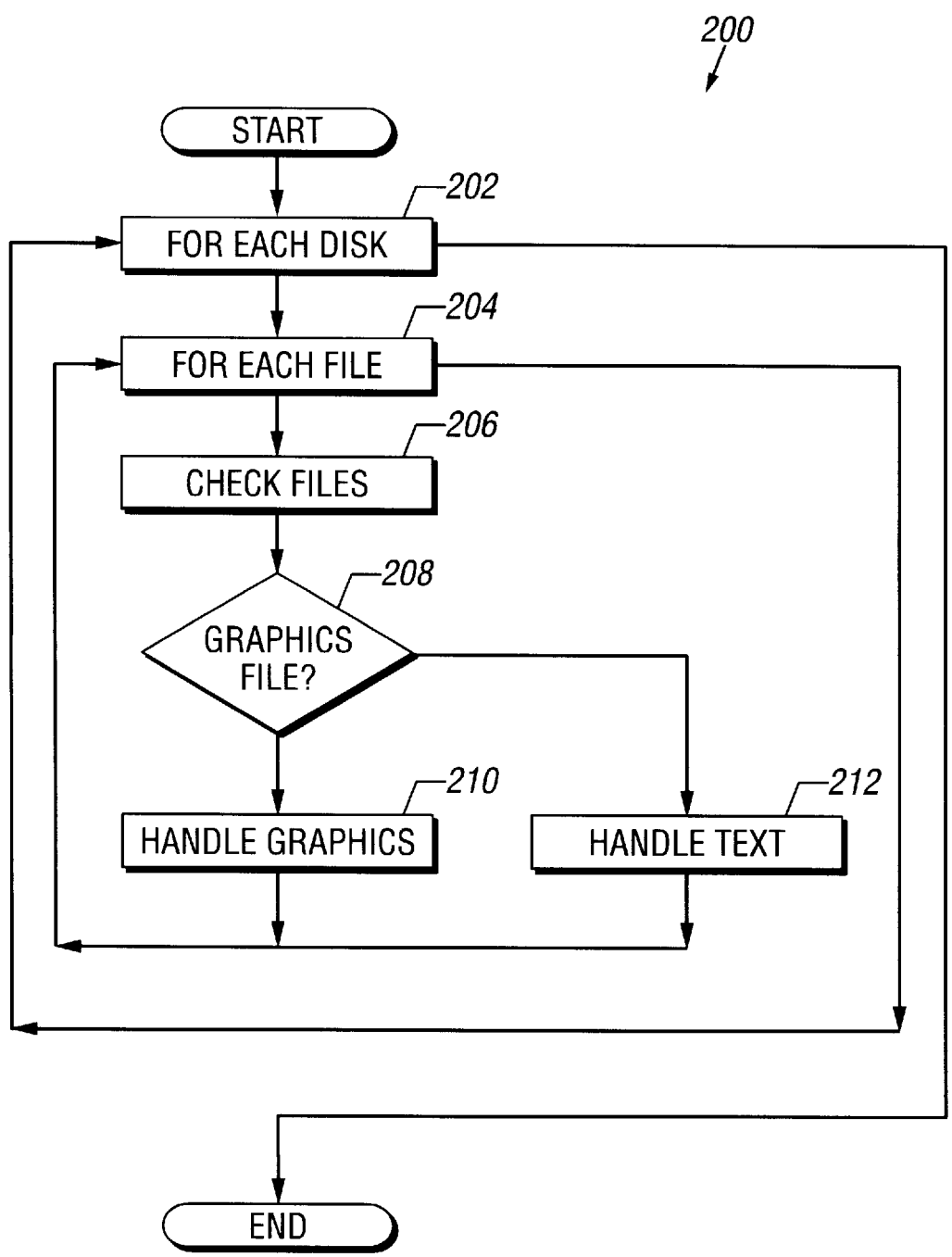

ELECTRONIC FILE ANALYZER AND SELECTOR

BACKGROUND OF THE INVENTION

1. Field of the Invention

The present invention relates to an apparatus and method for reviewing electronic documents. More particularly, the present invention relates to an apparatus and method for locating and analyzing electronic documents that contain graphic images or objectionable language and presenting a list of such files to a user for review and destruction or some other action.

2. Description of the Related Art

The widespread use of personal computers (PC's), coupled with easy access to computer networks such as the Internet and electronic bulletin board systems (BBS's), has provided unprecedented access to adult subject matter for children. This adult subject matter consists of pornographic literature and photographs, descriptions of violent activities, and potential illegal activities, not to mention the use of offensive language. This material can be stored in electronic files that are easily copied from one computer system to another. The electronic files can contain graphic images (graphics type files) and text information (text type files). Some text documents, such as those written on word processors, can contain both text, graphic images, and audio clips.

There are software products available to prevent children from accessing portions of the Internet known to contain offensive material. Software products such as Net Nanny or other channel blockers and screeners, perform a guardian function by restricting children from accessing certain areas of the Internet known to harbor adult subject matter. Unfortunately, not all adult subject matter is limited to the Internet. The subject matter is also available on many electronic bulletin boards. In addition, children can gain access to adult subject matter by using their friend's PC's that are not equipped with Net Nanny or similar software protections. Once downloaded to their friend's PC, the offensive material can be copied onto floppy disks and transferred to the home PC, thereby circumventing Net Nanny. Aside from the problems with children, many corporations also have a similar unfilled need to find files with language that may expose the company to lawsuits for sexual harassment or illegal activity. There is, therefore, a need for an apparatus and method that identifies those files containing pre-selected objectionable subject matter on a PC or network system. It is an object of the present invention to remedy the problems inherent in the related art.

SUMMARY OF THE INVENTION

The present invention overcomes the disadvantages and limitations of the related art by providing an apparatus and method for finding objectionable material contained within electronic files, either on a PC or on a network.

The apparatus consists of a computer system that is provided with a microprocessor (or computer), a video display, a buffer memory, and at least one electronic file storage device capable of storing electronic files. Each of the electronic files is stored according to an operating system which incorporates a file name, a file name suffix, a mode, a time-stamp, and a file size. The method includes provisions for a real type property, a claimed type property, and a result type property for each electronic file. All of the electronic files are located on each of the storage devices.

The method of the present invention checks each file to determine the file's real type property. This is accomplished by reading all or a portion of the file to determine the file's signature. If the file signature is present, then it is compared to a library of known file signatures. If the file signature found is not among the library of known signatures, then the file is sent through a graphics filter to determine if the file is a graphics type of file or an audio clip, otherwise, the real property is set to unknown. Next, the file name suffix is checked against a library of file suffixes. If the file's suffix is among the list of suffixes, the claimed property is set to that suffix type. Otherwise, the claimed type is set to unknown. Graphics files and audio clips are automatically designated as questionable, prompting review by the user. Graphics files can include video and or movies. Text files have additional processing, including searches for words or terms related to topics that are inappropriate or potentially dangerous for certain users such as children. The checking process also looks for files that are disguised, such as a file with an executable suffix (.exe) which in reality is a graphics file that should have had a graphics suffix (like .gif). Finally, the checking process also looks for files that are hidden so that they are not listed in response to a directory command.

A listing of all suspicious, questionable, or graphics files are presented to the user. Reasons as to why the file was flagged are also presented. Once all of the flagged files are listed, the user is free to review or destroy the identified files.

DESCRIPTION OF THE DRAWINGS

For a more complete understanding of the present invention and the advantages thereof, reference should be made to the following Detailed Description taken in connection with the accompanying drawings in which:

FIG. 2 is a flowchart diagram of the overall process that is the preferred embodiment of the present invention for finding objectionable material in electronic files;

DESCRIPTION OF THE PREFERRED EMBODIMENTS

Figures 1, 6:
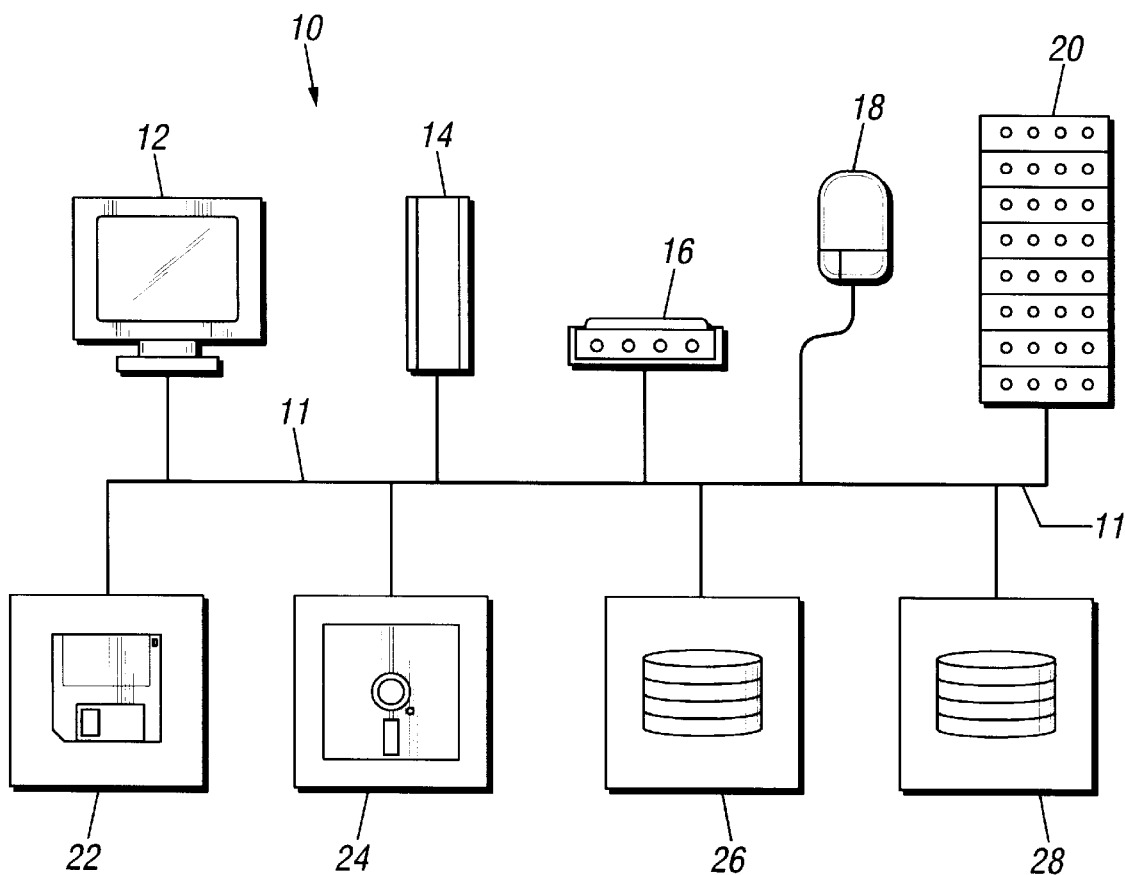
FIG. 1 illustrates a computer system with which the preferred embodiment of the present invention is implemented.
FIG. 6 is example computer code of a record that contains information about an electronic file that is utilized by an alternate embodiment of the present invention.

The apparatus of the preferred embodiment is shown in FIG. 1. The preferred apparatus is a personal computer (PC) in the form of a computer system 10 that has a data bus 11 to which are connected a variety of devices, namely: microprocessor (computer) 14, display monitor 12, modem 16, mouse 18, keyboard 20, floppy disk drives 22 and 24, one or more hard disk drives 26, and CD-ROM drive 28. The bus 11 contains a set of data lines, a set of address lines and a set of control lines. These various lines are used to transfer data from one device to another. For example, data in the form of an electronic file can be read from hard disk drive 26 and written to the microprocessor 14 for processing. Similarly, output from the microprocessor 14 can be written to floppy drive 22 via the data bus 11. Additional input/output devices may be attached to the computer system 10, including tablets, touch screens, light pens, joysticks, trackballs, and similar devices. Personal computer architecture and components are further explained in U.S. Pat. No. 5,572,207 by Harding, which is specifically incorporated herein by reference for all purposes. Alternate embodiments of computer system 10 may include mainframe computers, or networks of PC's that share a common file server or other storage media (not shown).

The overall method 200 of finding objectionable material within a computer system 10 is shown in FIG. 2.

Referring to FIG. 2, first, in step 202, the number of storage devices is determined. As described before, storage devices may consist of floppy disk drives 22 and 24 (if they have disks loaded) and other storage devices such hard disk drive 26 and CD-ROM drive 28. Alternate storage devices, such as random access memory (RAM), tape drives, and compressed "zip" drives may also be included in the process of the present invention so long as they can be properly connected to and utilized by computer system 10.

In step 204, for each storage device located in step 202, all of the electronic files stored on the storage device are located. The process of the present invention provides a record of information for each of the electronic files found in step 204. Example code of this record, utilizing the Object Pascal programming language, is shown in FIG. 6. It will be understood by those skilled in the art that other programming languages, such as C and C++ among others, could be used equally well to program computer system 10. Referring to FIG. 6, the record 600 contains a variety of file properties. The name of the property, and a brief description of the property, is given in the table below:

contains text only or if the file contains a graphics image or audio clip. If the file checked in step 208 is a graphics file or audio clip, the file will be handled in step 210. If the file checked in step 208 contains text (as well as graphic images and audio clips), then the file is handled in step 212 as a text file. It will be understood by those skilled in the art that an audio/video clip including movies and AVI's may be found in the same manner as a graphic image, either independently or embedded within a text file. In the following detailed description, the term audio clip may be substituted for the term graphics image as both types of files are searched for contemporaneously and in an similar or equivalent manner known in the art.

Figure 3:
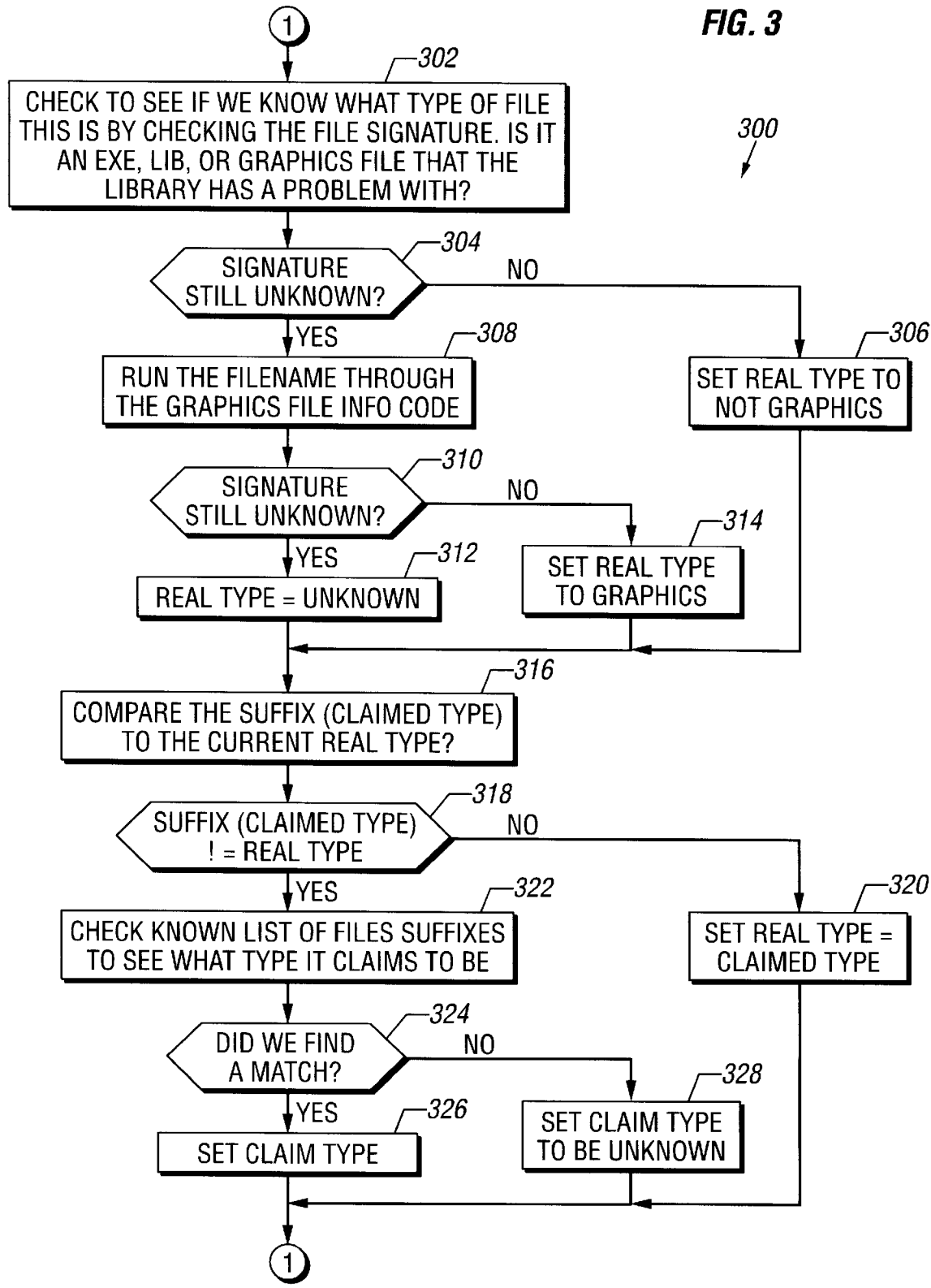
FIG. 3 is a flowchart diagram of a portion of the preferred embodiment of the present invention for finding objectionable material in electronic files.

FIG. 3 is a flowchart of a sub-process for checking electronic files. Specifically, the steps shown in FIG. 3 are encompassed by step 206 of FIG. 2. In the process of locating files (step 204 of FIG. 2), the size of the file, its time-stamp, its file name, file suffix and mode are read and placed into the file size property 602, the date time property 604 the file name property 610, the file suffix property 612, and the mode property 606, respectively. This information is typically available via the computer system 10 operating system. In step 302, the file's signature is read. Although file signatures are not mandatory, it is customary within the art to reserve a series of bytes at the beginning of an electronic file for designating the proprietary format of the file. This allows other software programs and the operating system to recognize electronic files as "belonging" to the particular software program—thus the designation "signature." The file signature is normally placed in the first series of bytes in the file that is called the "header." Aside from the file signature, additional bytes of a file may be read in order to find graphics files hidden near the end of text documents.

The file signature, if one is found, is loaded into the file record's file signature property 611. In step 302, the file signature property 611 is checked against a list or library of

| Property | Description |
| --- | --- |
| Size 602 | The number of bytes taken up by the file on the storage device. |
| Date Time 604 | Indicates the time stamp (i.e. the date and time) when the file was created or last modified). |
| Mode 606 | The mode of file storage (e.g., hidden, archive, etc.). |
| Color Code 608 | The color code is itself a record containing integer values for the amount of red, yellow, and blue that are used to color an icon that is presented to the user. The color of the icon is used to indicate the type of file found. |
| File Name 610 | The name associated with the electronic file. This name is the one obtained directly from the operating system such as Microsoft Windows, OS2, UNIX, or the Macintosh OS. |
| File Signature 611 | The file signature is typically contained within the "header" portion of the file, i.e., the first few bytes. Many proprietary file formats place a characteristic series of bytes at the beginning of a formatted file that designates the file as being created by the particular software program and conforming that format. |
| File Suffix 612 | The file suffix is typically the three character designation that is appended to File Name 610. Typical file suffixes are ".exe" for executable programs, ".bat" for batch files, ".doc" for word processor documents, and ".gif" for graphics files. |
| Reason 614 | This string variable contains an explanation of why the file was selected for presentation to the user. |
| Real Type 616 | This variable contains a code designating the actual type of file found by analyzing the contents of the file such as the File Signature 611. |
| Claimed Type 618 | This variable contains a code designating the claimed type of file found by examining the File Suffix 612. |
| Result Type 620 | This variable contains a code designating the presentation category for the file, i.e., this code specifies whether or not the file information will be presented to the user and under which category. |

Referring again to FIG. 2, step 206, all, or at least a portion of, the contents of each file is analyzed. Next, in step 208, a decision is made whether or not the contents of the file known file signatures. In step 304 it is determined whether the file signature is not among the list of known file signatures. If the answer in step 304 is no (i.e., the file signature is among those known), then the real type property 616 of the file is set to "not graphics" in step 306. As with all property settings, it will be understood by those skilled in the art that the actual setting can be in the form of a character array (or string) or a unique boolean, integer or real value specifically designated for that purpose. If the file signature is still unknown (i.e., the file signature was not among the library of known file signatures), then either the first 132 8-byte characters or the entire file (whichever is less) is read into a buffer memory. The contents of the buffer memory are sent through a graphics file filter in step 308. The graphics file filter determines, if possible, the correct file signature of the file assuming the file is a graphics file. In step 310, it is determined whether or not the correct file signature has been determined in step 308. If the filter finds a known graphics type, then the file's real type property 616 is set to graphics in step 314. Otherwise, the file's real type property 616 is set to unknown in step 312.

Referring still to FIG. 3, in step 316, the file suffix of the file name is read into the file suffix property 612 of the file properties record 600. The file suffix is typically the last three characters of the file name that come after the final "." character. Typical file name suffixes include, but are not limited to: ".exe," ".dll," ".bat," ".tif," ".gif," ".pcx," ".bmp," ".jpg," ".com," ".doc," ".htm," and ".wpd". The file suffix is used as a handy way to differentiate between different files and different file formats. In step 316, the file suffix property 612 is compared to the real type property 616 in order to determine if the file signature does not correlate to the file suffix. This determination is made in step 318. If the answer in step 318 is no, i.e. the file suffix property 612 is equivalent to the real type property 616, then the claimed type property 618 is set equivalent to the real type property 616 in step 320. If the answer to step 318 is yes, then the file suffix 612 is compared to a library or list of known file suffixes in step 322. The library of known suffixes contains an exhaustive list of suffixes as well as the file type normally associated with that suffix (e.g., ile type in the library of suffixes for the matching suffix. If, in step 324, no match was found in the library of suffixes, then the claimed type property 618 is set to unknown.

Figure 4:
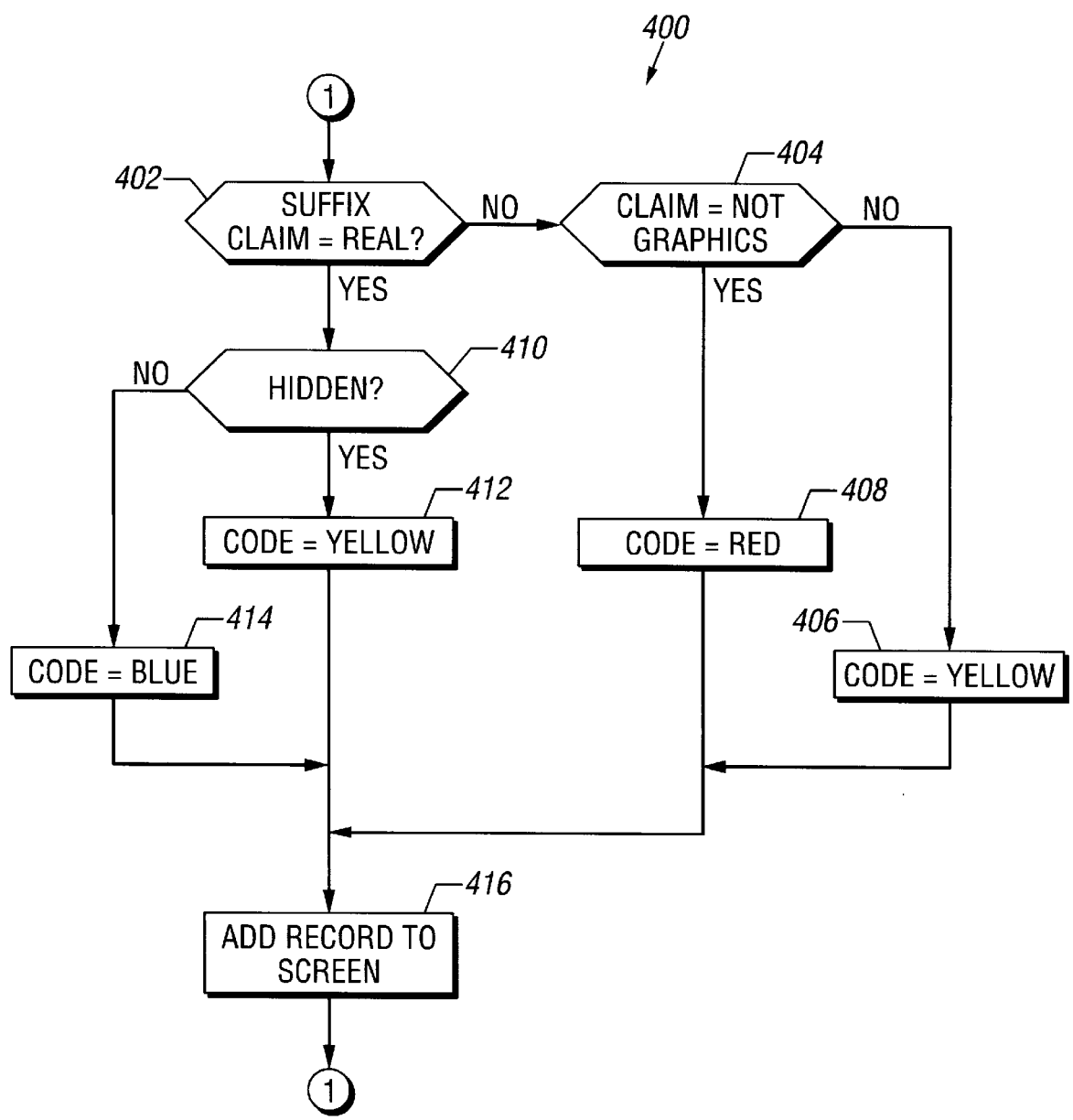
FIG. 4 is a flowchart diagram of a portion of the preferred embodiment of the present invention for finding objectionable material in electronic files.

Additional processing is illustrated in FIG. 4. In step 402, the claimed type property 618 is compared to the real type property 616. If the real type property 616 is not equivalent to the claimed type property 618 then a determination is made in step 404 to see whether or not the claimed type property 618 is set to not graphics. If the answer in step 404 is no, then the result type property 620 is set to questionable and the color code property 608 is set to yellow in step 406. If the answer in step 404 is yes, i.e., the claimed type property 618 is set to not graphics, then the result type property 620 is set to suspicious and the color code property 608 is set to red.

Still referring to FIG. 4, if the answer to step 402 is yes, i.e., the claim type property 618 is equivalent to the real type property 616, then a check is made to determine if the file is a hidden file in step 410. If the file is a hidden file then the result property 620 is set to questionable and the color code property 608 is set to yellow in step 412. Otherwise, the color code property 608 is set to blue and the result property 620 is set to okay. All of the files are listed onto display 12 and are sorted in order of severity, with the suspicious files listed first, the questionable files listed next, and the okay files listed last. For each file listed, the reason why the file is either suspicious or questionable is provided by setting the reason property 614 to one of the reasons in the following list:

"This file type cannot be identified.";
"This claims to be, and is a picture.";
"This hidden file contains a picture.";
"This file claims to be one thing (by its name) but is something else.";
"This file is labeled as a program but is really a picture.";
"This file is labeled as a picture but is really a program.";
"This text file contains words that match your criteria.";
"This picture is labeled as one type but is really another.";
"This file appears to contain an audio clip.";
"This hidden file contains an audio clip."; and
"This file claims to be one thing (by its name) but is an audio clip."

Figure 5:
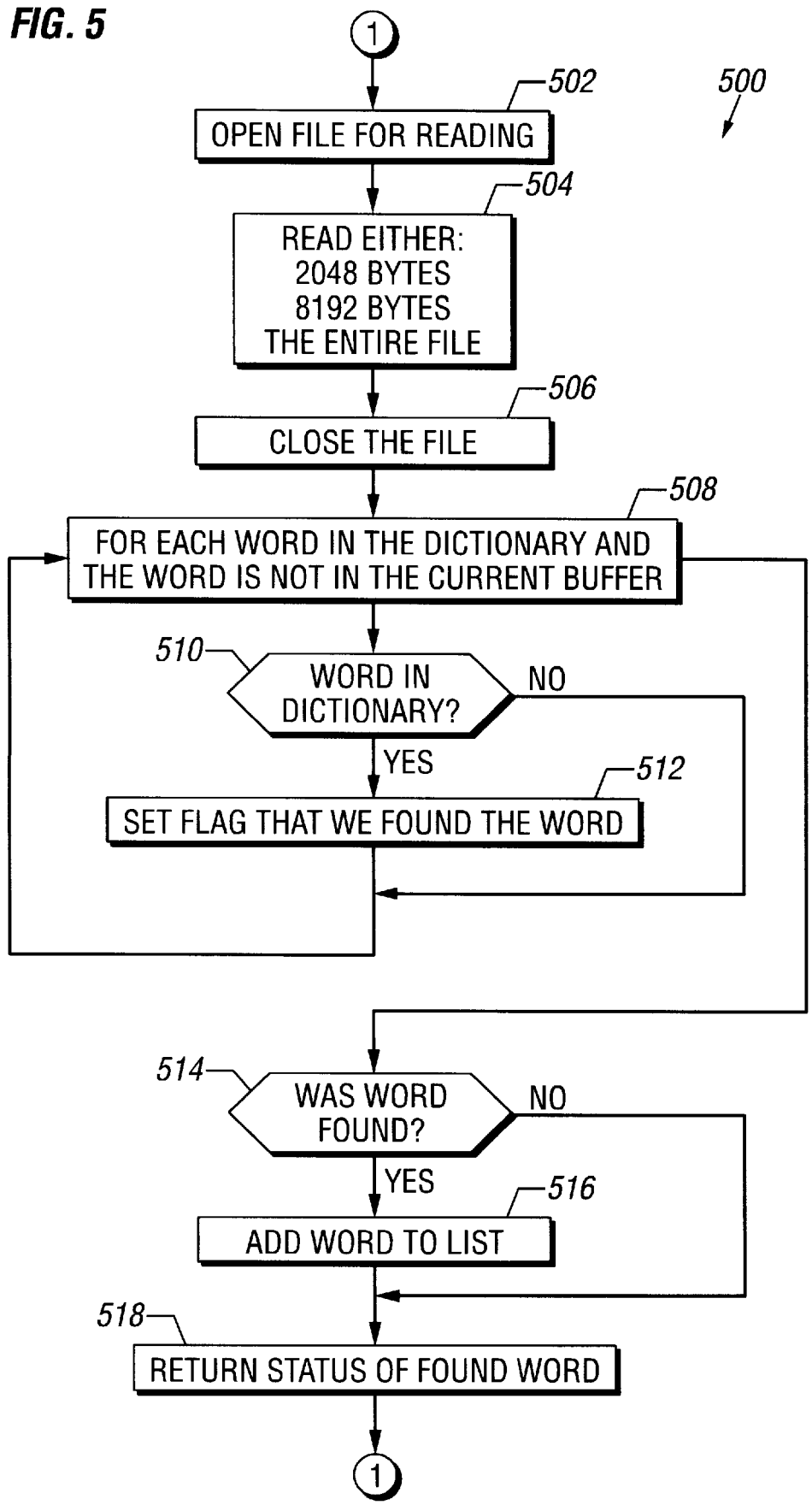
FIG. 5 is a flowchart diagram of a portion of the preferred embodiment of the present invention for finding objectionable material in electronic files.

The handling of a text document (text file) according to step 212 of FIG. 2 is more fully illustrated in FIG. 5. Text documents, as mentioned before, can contain text, graphics and audio clips. In the preferred embodiment of the present invention, the user is presented with the option of performing an exhaustive search of all text files in order to find any and all graphic images and audio clips that may be embedded within a large text document. As an alternative to the exhaustive search, the user, in the preferred embodiment of the present invention, is able to select a cursory search where only a portion of each text file is searched for graphic images, audio clips and offensive text. In the preferred embodiment of the present invention, switches are also provided to search or not search for the following categories of potentially objectionable material in text files:

Sexually Explicit (material containing graphic descriptions of sexual intercourse or sexually related activities);

Computer Hacking (words or terms that are likely to appear in material that discusses unauthorized access to other computers, over networks or telephone lines);

Drugs/Substance abuse (words or terms that are likely to appear in material that discusses use of illicit drugs and other dangerous substances);

Physically harmful (words or terms that are likely to appear in material that discusses actions that may be harmful to children or to others such as guns, or instructions on how to make explosives); and Potentially Illegal (words or terms that are likely to appear in material that discusses actions that may be against local, state, or federal laws).

Referring now to FIG. 5, the text file is processed in the following manner. In step 502, the file is first opened for reading. In the preferred embodiment of the present invention, the file is opened so that other programs can open and share the contents of the file. In step 504, either the first 132 8-byte characters are read, or the entire file is read into the buffer memory. If the file is less than 132 characters long, then the entire file is read. Only when a cursory search is requested and the file is in less than 132 characters long are all of the characters read. If the user has designated that an exhaustive search be conducted, the entire file is loaded into the buffer memory. Once loaded into the buffer memory, the file is closed in step 504 to allow processing by other software programs.

Step 508 of FIG. 5 comprises a loop wherein all words contained in the document are compared to the words or terms in a text dictionary. The text dictionary is actually a series of dictionaries, one for each type of objectionable subject matter (e.g., sexually explicit, hacking, etc.). Every word that is contained within the buffer memory is compared to each of the words or terms in the various dictionaries. The user can select which dictionaries will be referred to via the switches provided for selecting or de-selecting the particular subject matter. If a word in the text file matches one in a dictionary, then the result of step 510 will be yes and a flag will be set in step 512 indicating that the file contains objectionable material. If the answer to step 510 is no, then the next word in the text file is selected for similar comparison according to step 508.

Once all of the words and terms in the text file have been compared to each of the selected dictionaries according to step 508, then the determination in step 514 is performed. If the answer in step 514 was no (i.e., no objectionable words, graphic images, or audio clips were found) then the result type property 620 is set to okay. If the answer to step 514 was yes (i.e., either objectionable words, a graphic image, or an audio clip were found) then the result type property 620 is set to questionable or suspicious, depending upon the type of word or embedded graphic or audio clip was found.

Once all of the files have been reviewed, a list of the various files are presented on the display 12 for the user's review and, if necessary, destruction or some other action. The files are ordered by their result type property 620 and a color icon is displayed according to the color code property 608 in order to aid the user in distinguishing harmful files from innocuous ones. In the preferred embodiment of the present invention, along with the file's file name property 610, the file size 602, the date time property 604, the mode 606, the reason property 614, and the color code in icon form for the particular result type property 620 is also presented to the user. The user is given the option of printing the list of files to a standard printer (not shown).

Of course, many modifications and adaptions to the present invention could be made to advantage without departing from the spirit of the invention. Further, some features -discussion is intended to be merely illustrative of the invention. Numerous alternative embodiments may be devised by those having ordinary skill in the art without departing from the spirit and scope of the following claims.

What is claimed is:

1. A process for searching objectional material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction, g) determining said file signature of said electronic file, h) comparing said file signature to a list of predetermined file signatures, and i) if said file signature is contained within said list of predetermined file signatures than setting said real type property of said file to non-graphics, j) comparing a file suffix of said file to said real type property of said file, and k) if said file suffix is equivalent to said real type property of said file then setting said claimed type property of said file to said real type property of said file, l) if said real type property of said file is equivalent to said claimed type property of said file then examining said file to determine if said file is a hidden file, m) if said file is a hidden file, then setting said result type property of said file to questionable.

2. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction, g) determining said file signature of said electronic file, h) comparing said file signature to a list of predetermined file signatures, and i) if said file signature is contained within said list of predetermined file signatures than setting said real type property of said file to non-graphics j) comparing a file suffix of said file to said real type property of said file, and k) if said file suffix is equivalent to said real type property of said file then setting said claimed type property of said file to said real type property of said file, l) if said real type property of said file is equivalent to said claimed type property of said file then examining said file to determine if said file is a hidden file, m) if said file is not a hidden file, then setting said result type property of said file to okay.

3. A process for searching objectional material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction, g) determining said file signature of said electronic file, h) comparing said file signature to a list of predetermined file signatures, and i) if said file signature is contained within said list of predetermined file signatures than setting said real type property of said file to non-graphics, j) comparing a file suffix of said file to said real type property of said file, and k) if said file suffix is not equivalent to said real type property of said file then comparing said file suffix to a predetermined list of file suffixes, l) if said file suffix is not contained within said predetermined list of file suffixes then setting said claimed type property of said file to unknown, m) if said real type property of said file is equivalent to said claimed type property of said file then examining said file to determine if said file is a hidden file, n) if said file is a hidden file, then setting said result type property of said file to questionable.

4. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction, g) determining said file signature of said electronic file, h) comparing said file signature to a list of predetermined file signatures, and i) if said file signature is contained within said list of predetermined file signatures than setting said real type property of said file to non-graphics j) comparing a file suffix of said file to said real type property of said file, and k) if said file suffix is not equivalent to said real type property of said file then comparing said file suffix to a predetermined list of file suffixes, l) if said file suffix is not contained within said predetermined list of file suffixes then setting said claimed type property of said file to unknown, m) if said real type property of said file is equivalent to said claimed type property of said file then examining said file to determine if said file is a hidden file, n) if said file is not a hidden file, then setting said result type property of said file to okay.

5. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction, g) determining said file signature of said electronic file, h) comparing said file signature to a list of predetermined file signatures, and i) if said file signature is contained within said list of predetermined file signatures than setting said real type property of said file to non-graphics j) comparing a file suffix of said file to said real type property of said file, and k) if said file suffix is not equivalent to said real type property of said file then comparing said file suffix to a predetermined list of file suffixes, l) if said file suffix is contained within said pre-determined list of file suffixes then setting said claimed type property of said file to a file type of a suffix on said pre-determined list of file suffixes that matched said file suffix m) if said real type property of said file is equivalent to said claimed type property of said file then examining said file to determine if said file is a hidden file, n) if said file is a hidden file, then setting said result type property of said file to questionable.

6. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction, g) determining said file signature of said electronic file, h) comparing said file signature to a list of predetermined file signatures, and i) if said file signature is contained within said list of predetermined file signatures than setting said real type property of said file to non-graphics j) comparing a file suffix of said file to said real type property of said file, and k) if said file suffix is not equivalent to said real type property of said file then comparing said file suffix to a predetermined list of file suffixes, l) if said file suffix is contained within said pre-determined list of file suffixes then setting said claimed type property of said file to a file type of a suffix on said pre-determined list of file suffixes that matched said file suffix m) if said real type property of said file is equivalent to said claimed type property of said file then examining said file to determine if said file is a hidden file, n) if said file is not a hidden file, then setting said result type property of said file to okay.

7. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction, g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics k) comparing a file suffix of said file to said real type property of said file, and l) if said file suffix is equivalent to said real type property of said file then setting said claimed type property of said file to said real type property of said file, m) if said real type property of said file is equivalent to said claimed type property of said file then examining said file to determine if said file is a hidden file, n) if said file is a hidden file, then setting said result type property of said file to questionable.

8. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics, k) comparing a file suffix of said file to said real type property of said file, and l) if said file suffix is equivalent to said real type property of said file then setting said claimed type property of said file to said real type property of said file, m) if said real type property of said file is equivalent to said claimed type property of said file, then examining said file to determine if said file is a hidden file, n) if said file is not a hidden file, then setting said result type property of said file to okay.

9. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics k) comparing a file suffix of said file to said real type property of said file, l) if said file suffix is not equivalent to said real type property of said file then comparing said file suffix to a predetermined list of file suffixes, and m) if said file suffix is not contained within said predetermined list of file suffixes then setting said claimed type property of said file to unknown, n) if said real type property of said file is equivalent to said claimed type property of said file then examining said file to determine if said file is a hidden file, o) if said file is a hidden file then setting said result type property of said file to questionable.

10. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics, k) comparing a file suffix of said file to said real type property of said file, l) if said file suffix is not equivalent to said real type property of said file then comparing said file suffix to a predetermined list of file suffixes, and m) if said file suffix is not contained within said predetermined list of file suffixes then setting said claimed type property of said file to unknown, n) if said real type property of said file is not equivalent to said claimed type property of said file, and if said claimed type property of said file is equivalent to graphics, then setting said result type property of said file to suspicious.

11. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics k) comparing a file suffix of said file to said real type property of said file, l) if said file suffix is not equivalent to said real type property of said file then comparing said file suffix to a predetermined list of file suffixes, and m) if said file suffix is contained within said predetermined list of file suffixes then setting said claimed type property of said file to a file type of a suffix on said pre-determined list of file suffixes that matched said file suffix, n) if said real type property of said file is equivalent to said claimed type property of said file then examining said file to determine if said file is a hidden file, o) if said file is a hidden file, then setting said result type property of said file to questionable.

12. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics k) comparing a file suffix of said file to said real type property of said file, l) if said file suffix is not equivalent to said real type property of said file then comparing said file suffix to a predetermined list of file suffixes, and m) if said file suffix is contained within said predetermined list of file suffixes then setting said claimed type property of said file to a file type of a suffix on said pre-determined list of file suffixes that matched said file suffix, n) if said real type property of said file is equivalent to said claimed type property of said file then examining said file to determine if said file is a hidden file, o) if said file is not a hidden file, then setting said result type property of said file to okay.

13. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics, k) comparing a file suffix of said file to said real type property of said file, and l) if said file suffix is equivalent to said real type property of said file then setting said claimed type property of said file to said real type property of said file, m) if said real type property of said file is equivalent to said claimed type property of said file then examining said file to determine if said file is a hidden file, n) if said file is a hidden file, then setting said result type property of said file to questionable.

14. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction, g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics k) comparing a file suffix of said file to said real type property of said file, and l) if said file suffix is equivalent to said real type property of said file then setting said claimed type property of said file to said real type property of said file, m) if said real type property of said file is equivalent to said claimed type property of said file then examining said file to determine if said file is a hidden file, n) if said file is not a hidden file, then setting said result type property of said file to okay.

15. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics, k) comparing a file suffix of said file to said real type property of said file, l) if said file suffix is not equivalent to said real type property of said file then comparing said file suffix to a predetermined list of file suffixes, and m) if said file suffix is not contained within said predetermined list of file suffixes then setting said claimed type property of said file to unknown, n) if said real type property of said file is equivalent to said claimed type property of said file then examining said file to determine if said file is a hidden file, o) if said file is a hidden file, then setting said result type property of said file to questionable.

16. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics k) comparing a file suffix of said file to said real type property of said file, l) if said file suffix is not equivalent to said real type property of said file then comparing said file suffix to a predetermined list of file suffixes, and m) if said file suffix is not contained within said predetermined list of file suffixes then setting said claimed type property of said file to unknown, n) if said real type property of said file is equivalent to said claimed type property of said file, then examining said file to determine if said file is a hidden file, o) if said file is not a hidden file, then setting said result type property of said file to okay.

17. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics k) comparing a file suffix of said file to said real type property of said file, l) if said file suffix is not equivalent to said real type property of said file then comparing said file suffix to a predetermined list of file suffixes, and m) if said file suffix is contained within said predetermined list of file suffixes then setting said claimed type property of said file to a file type of a suffix on said pre-determined list of file suffixes that matched said file suffix n) if said real type property of said file is equivalent to said claimed type property of said file then examining said file to determine if said file is a hidden file, o) if said file is not a hidden file, then setting said result type property of said file to questionable.

18. A process for searching for objectionable material in a computer system having a computer, a display, a buffer memory, and at least one electronic file storage device capable of storing electronic files, said electronic files having a file name, a file suffix, and a file signature and a record array having a real type property, a claimed type property, and a result type property for each of said electronic files, comprising the steps of:

a) locating said electronic files on each of said storage devices, b) checking each of said electronic files on each of said storage devices to determine said real type property of said file, c) if said file checked in step b) is a graphics type file, then identifying said file as a graphics file, d) if said file checked in step b) is not a graphics type file then interrogating said file to determine if said file contains objectionable material, e) if said file interrogated in step d) contains objectionable material, then identifying said file as a text file containing objectionable material, and f) presenting an itemized list of said text files containing objectionable material and said graphics files to a user so that said user may select files for review or destruction, g) determining a file signature of said electronic file, h) comparing said file signature to a list of predetermined file signatures, and i) if said file signature is not contained within said list of predetermined file signatures, then sending said file through a graphics file filter in order to determine if said file is a graphics file, and j) if said file is determined to be a graphics file in step i) then setting said real type property of said file to graphics, k) comparing a file suffix of said file to said real type property of said file, l) if said file suffix is not equivalent to said real type property of said file then comparing said file suffix to a predetermined list of file suffixes, and m) if said file suffix is contained within said predetermined list of file suffixes then setting said claimed type property of said file to a file type of a suffix on said pre-determined list of file suffixes that matched said file suffix n) if said real type property of said file is equivalent to said claimed type property of said file then examining said file to determine if said file is a hidden file, o) if said file is not a hidden file, then setting said result type property of said file to okay.

* * * * *